United States Patent Office.

FRIEDRICH W. CH. WALDECK, OF HAGUE, NETHERLANDS.

FUEL.

SPECIFICATION forming part of Letters Patent No. 309,587, dated December 23, 1884.

Application filed March 6, 1884. (No specimens.)

*To all whom it may concern:*

Be it known that I, FRIEDRICH WILHELM CHRISTIAN WALDECK, of Hague, in the Kingdom of the Netherlands, have invented a certain new and useful Improvement in Artificial Fuel, of which the following is a specification.

My invention has for its object the utilization of the pulverized residues of combustible material—such as black coal, brown coal, coke, peat, and other fuel—which usually go to waste; and to this end the invention consists in adding to any suitable composition of such pulverous material a small quantity of fine coal, together with tar or some other fluid, carburet of hydrogen, and an alkaline solution.

In carrying out my said improvement I have found the following plan to be advantageous. I take nine hectoliters of coke or coal-dust, one hectoliter of medium fine black coal, and nine liters of coal-tar diluted by one liter of crude petroleum. The coal or coke dust and the fine black coal are first well mixed together, and the diluted coal-tar is then poured upon the mixture. After the same has been well stirred I add 0.75 kilog. of calcined carbonate of sodium, or other suitable alkali, which has been previously dissolved in fifteen to twenty liters of water. After being again thoroughly stirred the mass may be formed into bricks or balls, if desired. I may, if desired, add lime, or starch, potatoes, or other glutinous substance, to the mass for the purpose of giving an improved consistency to the bricks or balls. The quantity of lime or glutinous substance thus used may be varied according to circumstances.

I do not wish to be understood, however, as limiting myself to the exact proportions stated above, as the same may be varied; but in all cases the addition of tar or other carburets of hydrogen is so insignificant that it could never effect and insure a regular combustion as is required by a good fuel if the alkaline solution were not applied.

Fuel prepared by my method possesses great heating power, and is prepared with a very small quantity of black coal and tar.

I do not herein claim, broadly, the method of mixing the waste material of combustible matters with coal and fluid carburets of hydrogen; but What I do claim, and desire to secure by Letters Patent, is—

1. The method of preparing fuel, consisting in mixing the waste material or pulverous residues of combustible matter with solid fuel, fluid carburets of hydrogen, and an alkaline solution, substantially as specified.

2. The method of preparing fuel, consisting in mixing the pulverous residue of combustible material with solid fuel, fluid carburets of hydrogen, an alkaline solution, and lime, or starch, potatoes, or other gluten, and subsequently forming the mass into bricks, blocks, or lumps, substantially as specified.

In testimony that I claim the foregoing as my invention I have signed my name, in presence of two witnesses, this 1st day of February, 1884.

F. W. CH. WALDECK.

Witnesses:
TH. E. TINSLOF,
HERMANN PAEPKE.